INVENTOR.
CLARENCE O. BEARD,
BY Frank S. Troidl
ATTORNEY

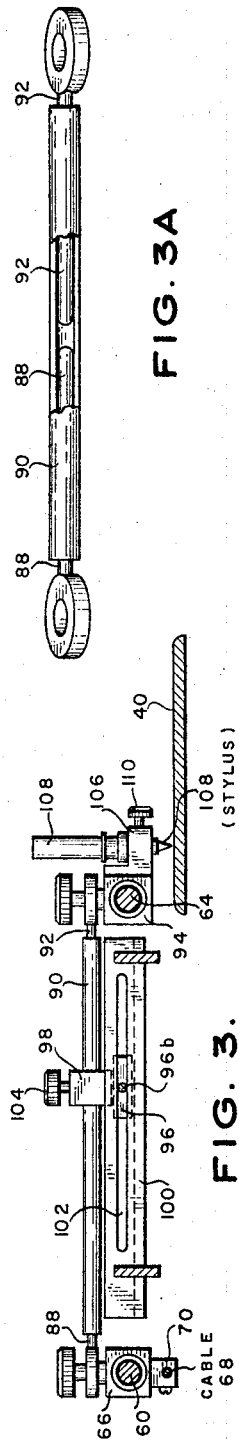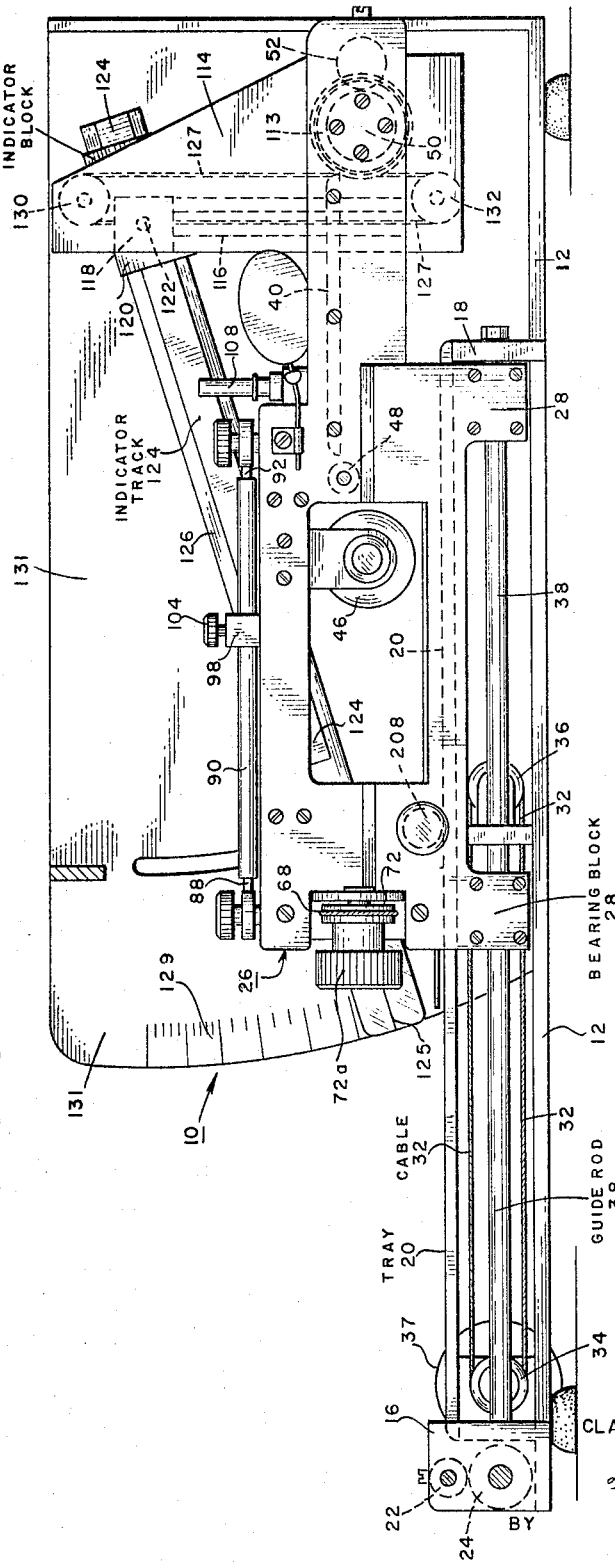

Aug. 23, 1966

C. O. BEARD 3,267,575

BIDIRECTIONAL SCALE CONVERTER

Filed April 16, 1964

INVENTOR.
CLARENCE O. BEARD,

BY Frank S. Troidl

ATTORNEY.

United States Patent Office 3,267,575
Patented August 23, 1966

3,267,575
BIDIRECTIONAL SCALE CONVERTER
Clarence O. Beard, Houston, Tex., assignor, by mesne assignments, to Esso Production Research Company, Houston, Tex., a corporation of Delaware
Filed Apr. 16, 1964, Ser. No. 360,190
3 Claims. (Cl. 33—23)

This invention relates to scale converters. More particularly, this invention is a method and apparatus for reproducing graphs or analog-type signals at different vertical and horizontal scales.

Often it is necessary or desirable to reproduce graphs or analog signals on a second record which has a different vertical scale and a different horizontal scale from the original record. For example, well logs obtained by logging tools lowered in a borehole must often be reproduced at different vertical and horizontal scales. Well logs such as resistivity logs, velocity logs, potential logs, etc., are usually taken as functions of the depths of the formations being logged. It is often desirable to change the signals which are functions of depth to signals which are functions of the time it takes seismic energy to travel from seismic sources to the subsurface formations. Also, it may be desirable to change the amplitude scale on the reproduced logs.

The method and apparatus to be described herein automatically reproduces the record on paper with the reproduced record being at different vertical and horizontal scales when compared to the original record. Briefly, the traces on a record are followed with a trace-following member. A stylus automatically reproduces on the paper the traces on the record. The mechanical interconnection between the trace-following member and the stylus is such that the stylus is moved along the paper an amount proportional to the vertical component of the traces while simultaneously the paper is moved with respect to the stylus an amount proportional to the horizontal component of the traces.

The invention, as well as its many advantages, will be further understood by reference to the following detailed description and drawings in which:

FIG. 2 is a side elevational view, partly in section, of the new apparatus;

FIG. 3 and FIG. 3A are views showing in more detail some of the elements of the new apparatus;

Figure 1:
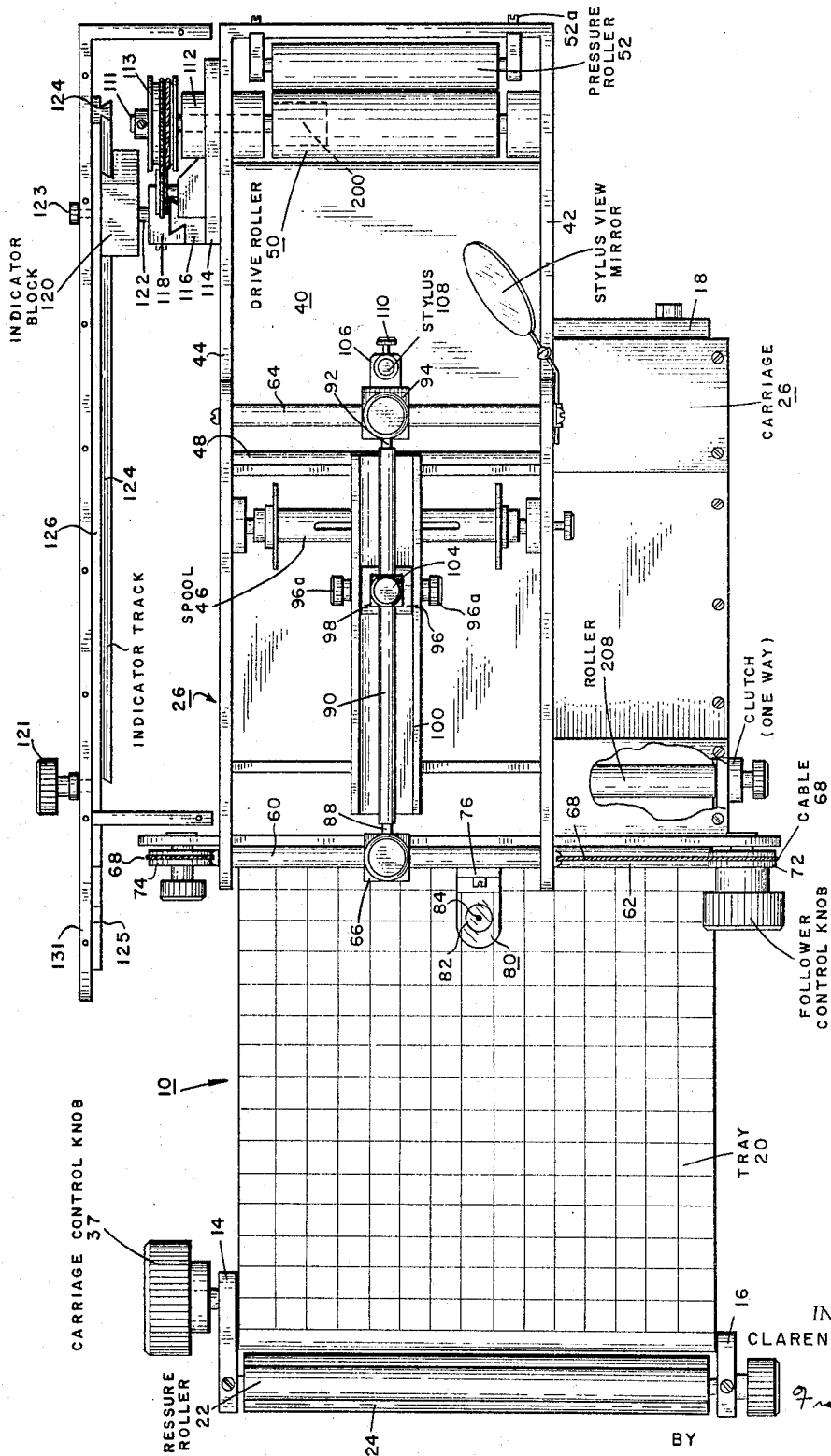
FIG. 1 is a top plan view, partly in section, of the new apparatus.

Referring to the drawings and more particularly to FIGS. 1 and 2, a graph support indicated generally by the numeral 10 is used to support the record or graph to be reproduced. The graph support 10 includes a baseplate 12, front roller mounts 14 and 16, and a rear plate 18. A paper tray 20 extends from the front of the apparatus to the rear plate 18. A front pressure roller 22 and a front paper roller 24 are mounted between the front roller mounts 14 and 16.

Figure 4:
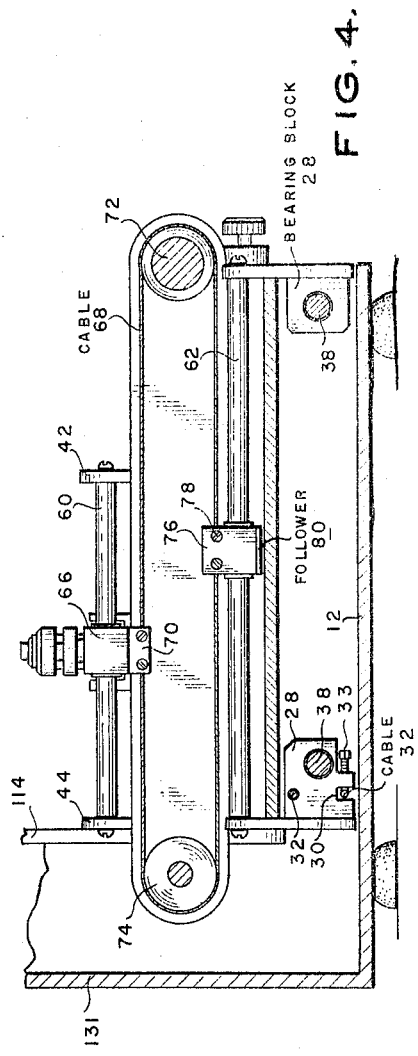
FIG. 4 is a fragmentary view, partly in section, showing a part of the mechanism for reproducing the vertical component of the original traces.

A carriage indicated generally by numeral 26 is slidably arranged on the base member 12 by means of guide rods 38 and bearing blocks 28 as seen more clearly in FIGS. 2 and 4. Means for moving the carriage 26 on the guide rods 38 include cable pulleys 34 and 36 (which are rotatably mounted on base member 12) and a continuous cable 32 which is wound on the pulleys. It is understood that the pulleys and cable may be replaced with sprockets and a chain if desired. As seen in FIG. 4, the lower strand of cable 32 is clamped in one of the bearing blocks 28 by means of a setscrew 33. Movement of the carriage 26 on the rods 38 is afforded by rotating carriage control knob 37 which is fixed to the shaft of pulley 34.

A scriber baseplate 40 is included as a part of the carriage 26 and is mounted between carriage end plates 42 and 44. Mounted transversely across the carriage 26 are a spool member 46, a guide roller 48, a drive roller 50, and a pressure roller 52. The pressure of roller 52 against drive roller 50 is adjusted by means of screws 52a.

The paper upon which the original graph is to be reproduced is initially wound upon the spool member 46 and extends over guide roller 48 and between the drive roller 50 and pressure roller 52. When the carriage 26 is moved, the drive roller 50 is rotated at a previously adjusted speed. The drive roller 50 moves the paper upon which the original graph is to be reproduced an amount proportional to the movement of the carriage 26 along the graph support 10. The mechanism for effecting this proportional movement of the paper will be subsequently described.

Connected across the carriage end plates 42 and 44 of carriage 26 are an upper front guide rod 60 and a lower front guide rod 62 (see FIGS. 1 and 4). Also, connected across carriage end plates 42 and 44 of carriage 26 is a rear guide rod 64. As shown in FIG. 1 and FIG. 4, a front transfer block 66 is mounted for movement along upper front guide rod 60. A wire 68 has its ends connected to leg 70 of front transfer block 66. The wire 68 extends around pulleys 72 and 74.

A line follower support 76 is connected to the wire 68. The position of line follower support 76 along the wire 68 may be adjusted by means of setscrews 78. A line-following member 80 (see FIG. 1) is connected to the line follower support 76.

The line-following member 80 is transparent and includes a circle 82 with the bull's-eye 84.

It can be seen that when the trace on the original record is followed by the bull's-eye 84, movement of the line-following member 80 transversely across the record will cause an equal and opposite movement of the front transfer block 66 along upper front guide rod 60.

The front transfer block 66 is connected to a rod 88 which extends into one side of rod housing 90. A second rod 92 connected to rear transfer block 94 extends into the other side of rod housing 90. Rods 88 and 92 are telescopically mounted within rod housing 90 (see FIG. 3A).

A pivot bearing block 96 upon which is mounted a pivot member 98 through which rod housing 90 extends is mounted for movement along a pivot channel member 100. Block 96 is releasably locked in position in member 100 by screw knobs 96a which are threadedly attached to pins 96b. As shown more clearly in FIG. 3, pins 96b extend through slots 102 provided in the sides of pivot channel member 100. The position of pivot member 98 along rod housing 90 may be adjusted by loosening pivot screw 104, moving pivot member 98 along rod housing 90 to the desired position, and again tightening pivot screw 104.

Movement of front transfer block 66 along upper front guide rod 60 causes a proportional movement of rear transfer block 94 along rear guide rod 64. The movement of rear transfer block 94 is in the same direction as the movement of line-following member 80.

A stylus holder 106 (see FIGS. 1 and 3) is connected to rear transfer block 94. A stylus 108 may be mounted within the stylus holder 106 by means of thumbscrew 110.

As shown in FIG. 1, the shaft 111 of drive roller 50 extends through a drive roller bearing mount 112. A pulley wheel 113 is mounted on shaft 111. The drive roller bearing mount 112 extends through a vertical drive slide mount 114. A dovetail track 116 is connected to the vertical drive slide mount 114. The drive block 118 rides vertically along the dovetail track 116.

The drive block 118 is pivotally connected to indicator block 120 by a pivot 122 (see FIG. 2). The indicator block 120 moves along an indicator slide track 124 which is connected to an adjustable arm 126. The slope of adjustable arm 126 is changed by loosening knob 121 and pivoting adjustable arm 126 about pivot pin 123. Index 125 and index 129 (see FIG. 5) are provided on adjustable arm 126 and plate 131, respectively, to indicate the slope of adjustable arm 126.

Figure 5:
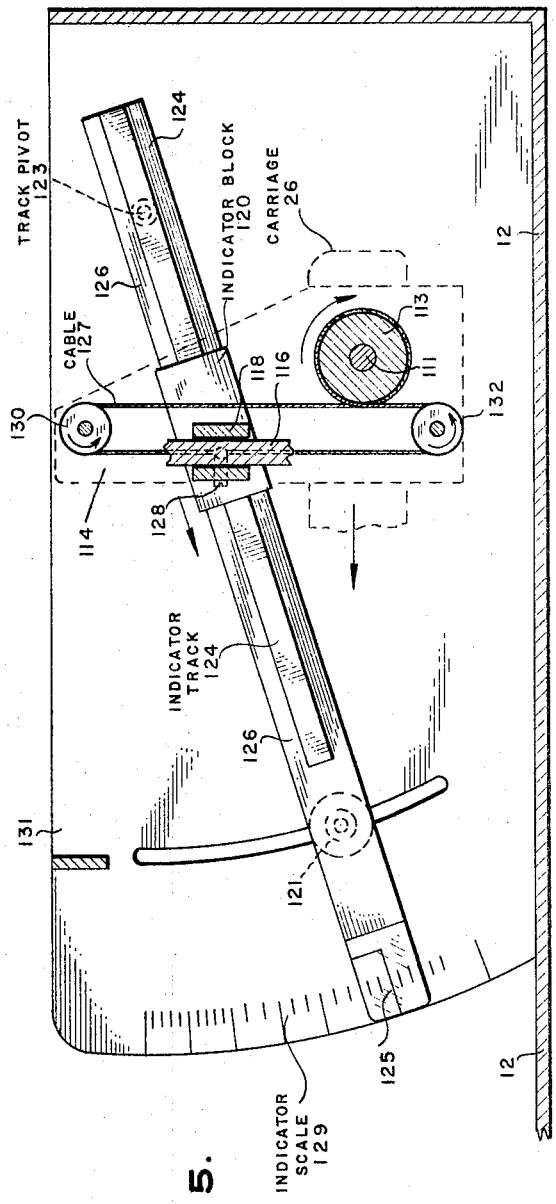
FIG. 5 is a view, partly in section, showing the mechanism for adjusting the horizontal scale.

A wire 127 has its two ends connected within drive block 118 by means of a setscrew 128 (see FIG. 5). The wire extends upwardly around upper pulley 130, then downwardly to the pulley wheel 113 and is looped around the pulley wheel 113. From pulley wheel 113, the wire extends around lower pulley 132 and then upwardly to drive block 118.

Figure 6:
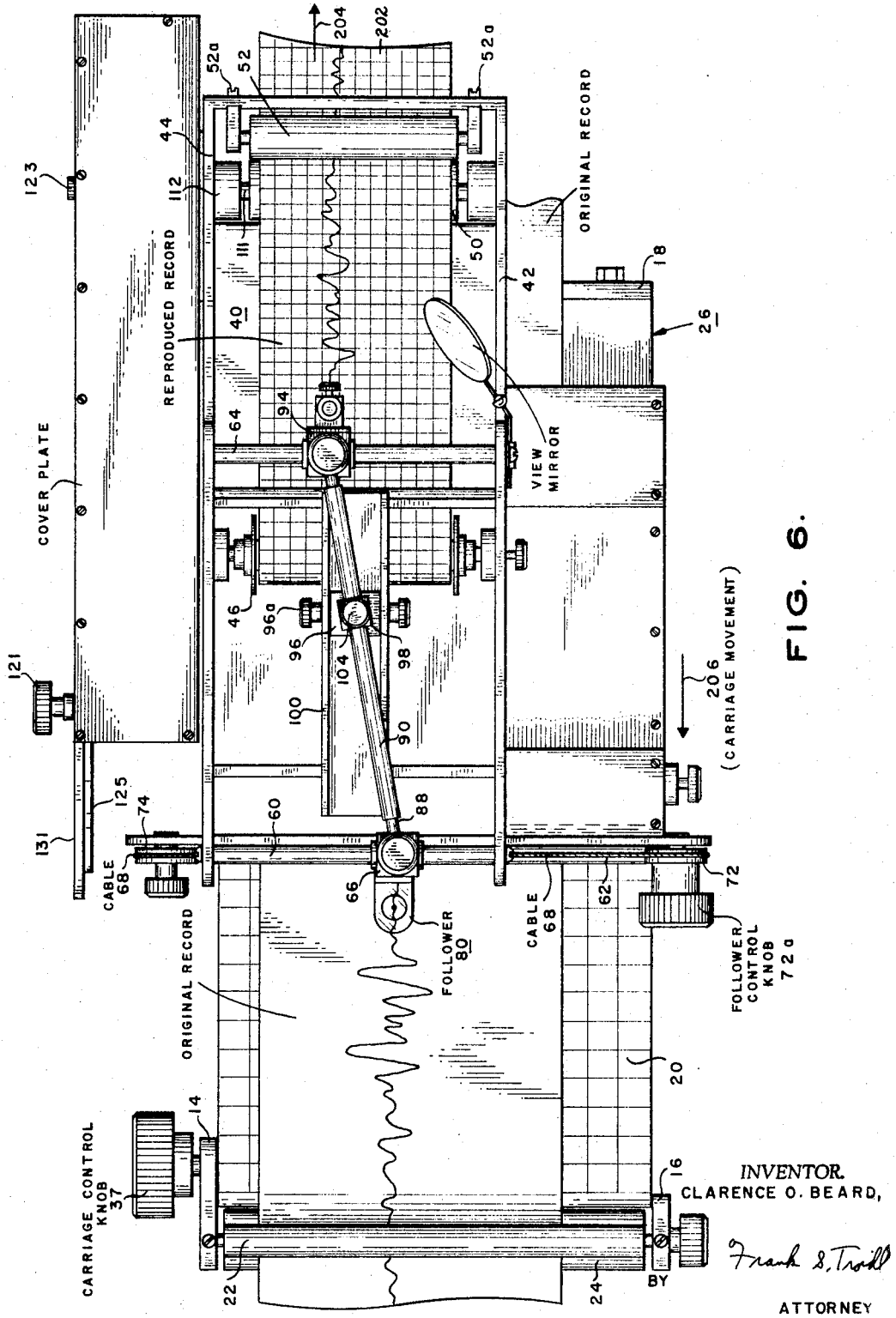
FIG. 6 is a view similar to FIG. 1 but showing an example of an original record and the reproduction.

A cylindrical clutch 200 (shown in dotted lines in FIG. 1) is mounted about shaft 111 and within drive roller 50. Cylindrical clutch 200 is of conventional design. The clutch 200 permits a force exerted on pulley wheel 113 in the direction of the arrow in FIG. 5 to rotate the drive roller 50 moving paper 202 in the direction of the arrow 204 of FIG. 6. However, any rotation of the pulley wheel 113 in the opposite direction allows clutch 200 to override and does not move drive roller 50.

A clutch mechanism similar to that shown in drive roller 50 is also included in the roller 208. The clutch mechanism (not shown) within roller 208 permits the roller to rotate when the carriage 26 is moved in the direction of the arrow 206 of FIG. 6. However, when the carriage 26 is moved in the opposite direction, the roller 208 will be locked against rotation.

In operation, the original record is placed on graph support 10. The paper upon which the record is to be reproduced is placed across the scriber baseplate 40. The pivot member 98 is longitudinally adjusted along rod housing 90 to provide the desired proportional movement of stylus 108 in response to the vertical component of the movement of line-following member 80.

The adjustable arm 126 is adjusted to provide the desired slope for obtaining the desired proportional movement of the paper on the carriage 26 in response to the horizontal component of the movement of line-following member 80.

The operator then follows the traces on the graph mounted on graph support 10 by turning carriage control knob 37 with one hand to move the carriage 26 over the graph paper and moving front transfer block 66 with the other hand turning knob 72a of pulley 72 to reproduce the vertical component of the traces. As the carriage 26 is moved in the direction of arrow 206, the paper 202 is moved a proportional amount in the direction of arrow 204. After the carriage 26 has been moved over that portion of the graph paper located on graph support 10, the operator simply pushes the carriage 26 back to its initial position. During this operation, the clutch mechanism in roller 208 locks the roller, thus causing the roller to pull the graph on graph support 10 along with the carriage 26. As the carriage 26 is moved back to its initial position, the clutch 200 permits shaft 111 to rotate without any corresponding rotation of drive roller 50. Hence, during this operation, the paper 202 remains stationary within carriage 26.

The above procedure is repeated until the entire original record has been reproduced with the desired vertical and horizontal scales.

I claim:

1. Apparatus for reproducing a graph at different vertical and horizontal scales comprising: a graph support; a single carriage, a line-following member mounted on the carriage; a stylus also mounted on the carriage; a baseplate on the carriage for supporting paper upon which the graph is to be reproduced; means interconnecting the line-following member and the stylus and adapted to move the stylus along the vertical direction of said paper an amount proportional to the vertical component of movement of the line-following member; means for moving the carriage along the horizontal direction of the graph support; and means responsive to movement of the carriage and adapted to move said paper with respect to the stylus in a horizontal direction an amount proportional to the amount of movement of the carriage.

2. An apparatus in accordance with claim 1 wherein the means interconnecting the line-following member and the stylus includes a rod and an adjustable pivot on the rod.

3. An apparatus in accordance with claim 1 wherein the means responsive to movement of the carriage and adapted to move said paper with respect to the stylus in a horizontal direction an amount proportional to the amount of movement of the carriage comprises: a roller for moving the paper; an arm; means for adjusting the slope of the arm; and means operatively associated with the arm and the roller including a drive mechanism responsive to movement of the carriage for rotating the roller an amount dependent upon the slope of the arm.

References Cited by the Examiner

UNITED STATES PATENTS

| 486,210 | 11/1892 | Hope | 33—22 |
| 3,063,150 | 11/1962 | Stelzer et al. | 33—23 |

FOREIGN PATENTS 479,504  3/1953  Italy.

LEONARD FORMAN, *Primary Examiner.*

ROBERT B. HULL, *Examiner.*

H. N. HAROIAN, *Assistant Examiner.*